(12) United States Patent
Joseph et al.

(10) Patent No.: US 11,765,737 B2
(45) Date of Patent: Sep. 19, 2023

(54) DCI TRIGGERED SRS ENHANCEMENTS

(71) Applicant: QUALCOMM Incorporated, San Diego, CA (US)

(72) Inventors: Vinay Joseph, Calicut (IN); Junyi Li, Fairless Hills, PA (US); Mostafa Khoshnevisan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/450,823

(22) Filed: Oct. 13, 2021

(65) Prior Publication Data

US 2022/0070838 A1 Mar. 3, 2022

Related U.S. Application Data

(62) Division of application No. 16/538,645, filed on Aug. 12, 2019, now Pat. No. 11,166,267.

(Continued)

(51) Int. Cl.
*H04W 72/231* (2023.01)
*H04W 72/23* (2023.01)
(Continued)

(52) U.S. Cl.
CPC .......... *H04W 72/23* (2023.01); *H04B 1/7143* (2013.01); *H04L 5/0051* (2013.01); *H04L 25/0226* (2013.01); *H04W 72/0446* (2013.01)

(58) Field of Classification Search
CPC .......... H04W 72/042; H04W 72/0446; H04W 72/231; H04W 52/16; H04B 1/7143;
(Continued)

(56) References Cited

U.S. PATENT DOCUMENTS

2013/0189976 A1 7/2013 Kim et al.
2013/0223394 A1 8/2013 Nishio et al.
(Continued)

FOREIGN PATENT DOCUMENTS

CN 102577522 A 7/2012
CN 107294686 A * 10/2017 ........... H04L 5/0048
(Continued)

OTHER PUBLICATIONS

Del Peral-Rosado J.A., et al., "Pilot Placement for Power-efficient Uplink Positioning in 5G Vehicular Networks", 2017 IEEE 18th International Workshop on Signal Processing Advances in Wireless Communications (SPAWC), IEEE, Jul. 3, 2017, pp. 1-5, XP033286499, DOI" 10.1109/SPAWC.2017.8227740 [retrieved on Dec. 19, 2017] abstract; figure 2 sections I, III.b, IV.A, IV.B.

(Continued)

*Primary Examiner* — Ayaz R Sheikh
*Assistant Examiner* — Louis Samara
(74) *Attorney, Agent, or Firm* — QUALCOMM Incorporated

(57) ABSTRACT

The present disclosure relates to methods and devices for signaling enhancements. In one aspect, a User Equipment (UE) can receive a configuration to transmit one or more sounding reference signals (SRSs) based on a downlink control information (DCI). The UE can also receive an indication of a plurality of non-contiguous resource blocks (RBs) based on the DCI. The UE can transmit a first SRS on a first set of one or more RBs of the plurality of non-contiguous RBs. Additionally, the UE can transmit a second SRS on a second set of one or more RBs of the plurality of non-contiguous RBs. The first set of one or more RBs and the second set of one or more RBs may be separated by a distance of at least one RB.

15 Claims, 14 Drawing Sheets

Related U.S. Application Data

(60) Provisional application No. 62/719,603, filed on Aug. 17, 2018.

(51) Int. Cl.
*H04B 1/7143* (2011.01)
*H04L 5/00* (2006.01)
*H04L 25/02* (2006.01)
*H04W 72/0446* (2023.01)

(58) Field of Classification Search
CPC . H04B 7/0452; H04L 5/0051; H04L 25/0226; H04L 5/0048; H04L 27/261; H04L 5/0092
See application file for complete search history.

(56) References Cited

U.S. PATENT DOCUMENTS

| | | | |
|---|---|---|---|
| 2014/0105110 A1 | 4/2014 | Hoshino et al. | |
| 2014/0211740 A1* | 7/2014 | Berggren | H04W 72/21 370/329 |
| 2016/0007343 A1 | 1/2016 | Yang et al. | |
| 2016/0057757 A1 | 2/2016 | Papasakellariou et al. | |
| 2016/0100407 A1* | 4/2016 | Gaal | H04L 5/0051 370/329 |
| 2017/0208590 A1 | 7/2017 | Kim et al. | |
| 2018/0092073 A1* | 3/2018 | Nogami | H04W 52/16 |
| 2018/0110057 A1* | 4/2018 | Park | H04B 7/0452 |
| 2018/0323917 A1* | 11/2018 | Um | H04L 27/261 |
| 2018/0375636 A1* | 12/2018 | You | H04W 72/20 |
| 2019/0109732 A1* | 4/2019 | Choi | H04L 1/00 |
| 2019/0313377 A1 | 10/2019 | Abdoli et al. | |
| 2020/0059907 A1 | 2/2020 | Joseph et al. | |
| 2020/0245314 A1 | 7/2020 | Hwang et al. | |
| 2020/0295973 A1 | 9/2020 | Choi et al. | |
| 2020/0305094 A1* | 9/2020 | Ouchi | H04W 72/23 |
| 2020/0322108 A1* | 10/2020 | Liu | H04W 48/12 |
| 2020/0350950 A1 | 11/2020 | Yao et al. | |
| 2020/0366531 A1 | 11/2020 | Choi et al. | |

FOREIGN PATENT DOCUMENTS

| | | | |
|---|---|---|---|
| KR | 102188674 B1 * | 10/2018 | |
| WO | 2017166998 A1 | 10/2017 | |
| WO | WO-2017169301 A1 * | 10/2017 | H04L 25/0226 |
| WO | WO-2018053359 A1 * | 3/2018 | |

OTHER PUBLICATIONS

Huawei, et al., "UL SRS Design for CSI Acquisition and Beam Management", 3GPP Draft, 3GPP TSG RAN WG 1 Meeting #88, R1-1701699, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 6, 2017, XP051220574, 8 Pages, Retrieved from the Internet: URL: http://www.3gpp.org/ftp/tsg_ran/WG1_RL1/TSGR1_88/Docs/ .[retrieved on Feb. 6, 2017] figure 2 sections 1, 2.1.1, 2.1.2, 2.2-2.5.

International Preliminary Report on Patentability—PCT/US2019/046365, The International Bureau of WIPO—Geneva, Switzerland, dated Mar. 4, 2021.

International Search Report and Written Opinion—PCT/US2019/046365—ISA/EPO—dated Jan. 31, 2020.

OPPO: "Text Proposal for Codebook based UL Transmission", 3GPP Draft, 3GPP TSG RAN WG1 Meeting AH 1801, R1-1800479, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 12, 2018, XP051384346, 6 Pages, Retrieved from the Internet: URL: http://www.3gpp.org/ftp/tsg%5Fran/WG1%5FRL1/TSGR1%5FAH/NR%5FAH%5F1801/Docs/ .[retrieved on Jan. 12, 2018] sections 1, 2.1, 2.2, 7.3.1.1.2, 6.1.1.1.

Partial International Search Report—PCT/US2019/046365—ISA/EPO—dated Nov. 28, 2019.

* cited by examiner

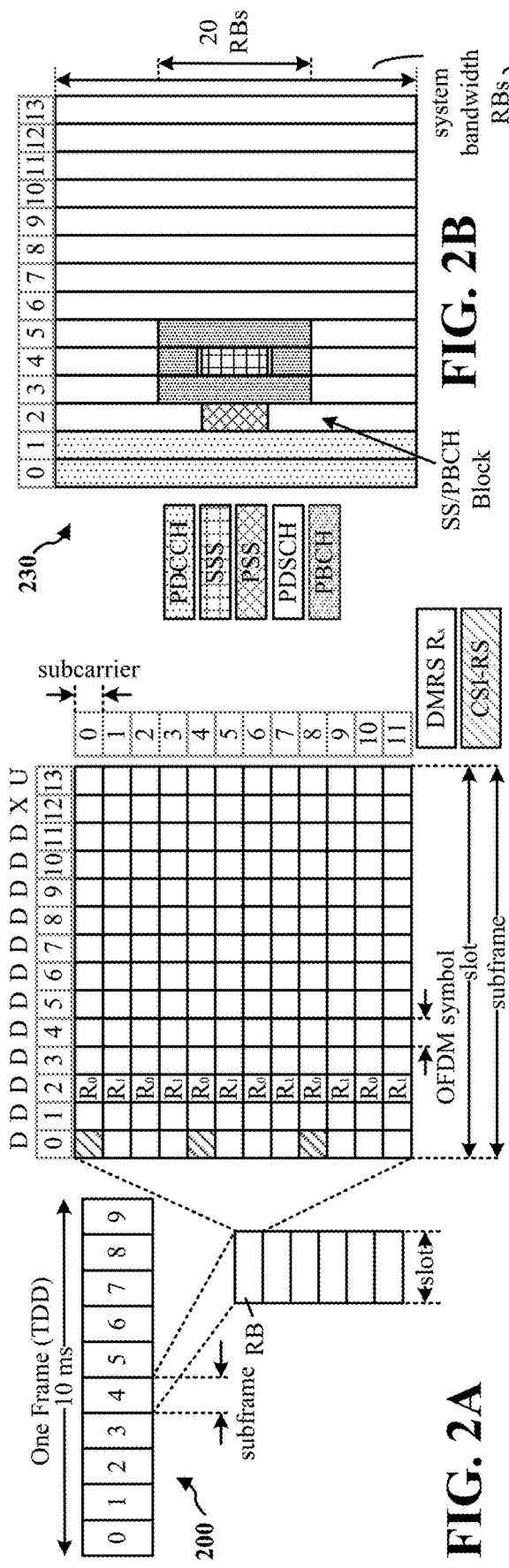
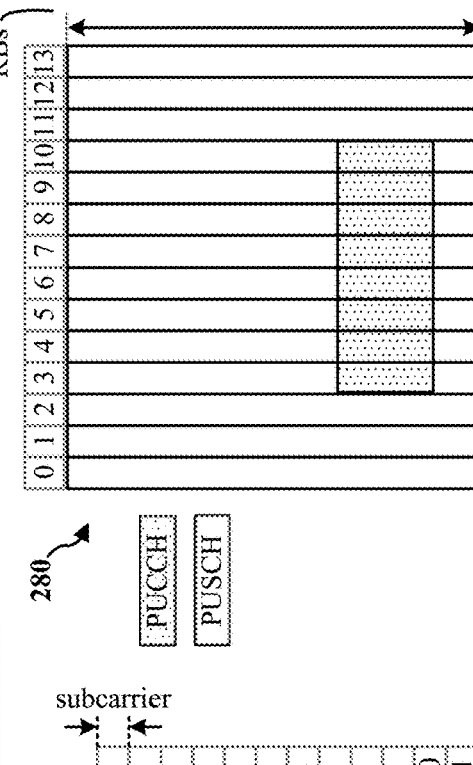
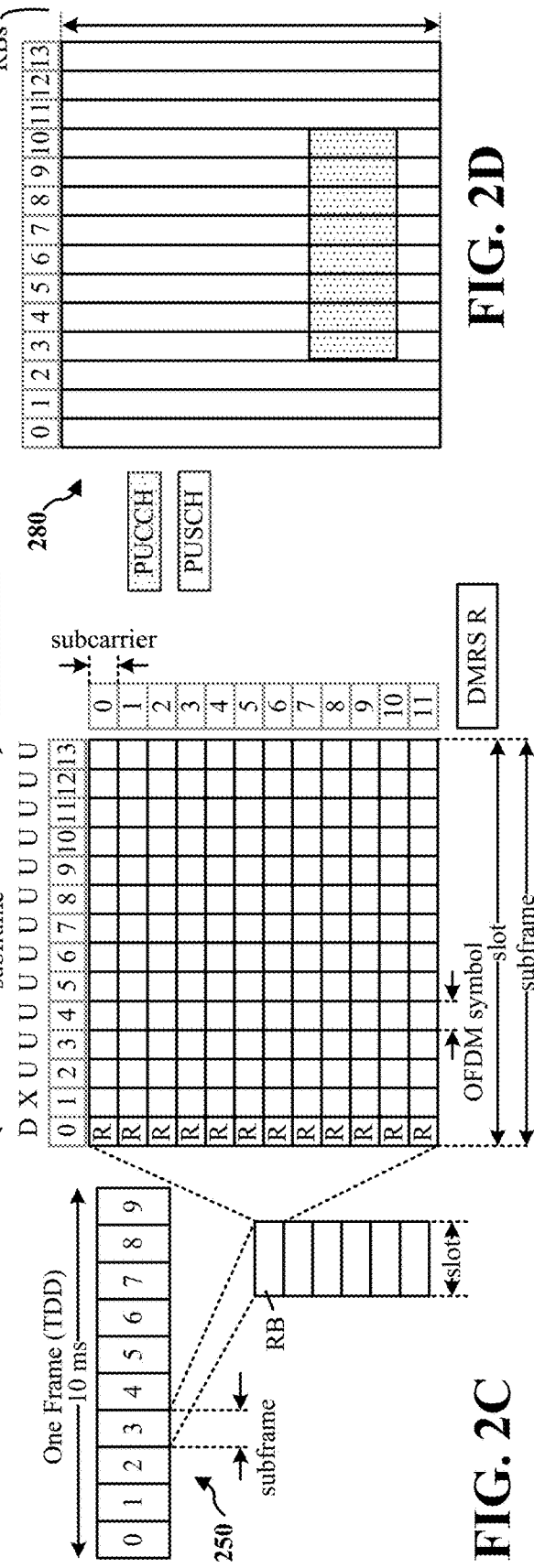
FIG. 2A  FIG. 2B  FIG. 2C  FIG. 2D

DCI TRIGGERED SRS ENHANCEMENTS

CROSS REFERENCE TO RELATED APPLICATION(S)

This application is a divisional of U.S. application Ser. No. 16/538,645, entitled "DCI TRIGGERED SRS ENHANCEMENTS" and filed Aug. 12, 2019, which claims the benefit of U.S. Provisional Application Ser. No. 62/719,603, entitled "DCI TRIGGERED SRS ENHANCEMENTS" and filed on Aug. 17, 2018, each of which is expressly incorporated by reference herein in its entirety.

TECHNICAL FIELD

The present disclosure relates generally to communication systems, and more particularly, to methods and apparatus related to sounding reference signals in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, e.g., millimeter wave (mmW) wireless communication, base stations and UEs can transmit and/or receive data. Such data can be allocated over one or more resources. In some instances, the information and/or data can be stored in non-contiguous resources. Accordingly, it can be advantageous and efficient to use signaling enhancement to ensure the accurate transmission and/or reception of data.

The present disclosure relates to methods and devices for signaling enhancements, and more specifically signaling enhancements triggered by downlink control information (DCI). In some aspects, a UE can receive a configuration to transmit one or more sounding reference signals (SRSs) based on a DCI. The UE can also receive an indication of a plurality of non-contiguous resource blocks (RBs) for a data transmission based on the DCI. The UE can transmit a first SRS on a first set of one or more RBs of the plurality of non-contiguous RBs. Additionally, the UE can transmit a second SRS on a second set of one or more RBs of the plurality of non-contiguous RBs. The first set of one or more RBs and the second set of one or more RBs may be separated by a distance of at least one RB.

In other aspects, the UE can determine one or more groups of contiguous physical RBs (PRBs) including one or more RBs in the indication for the data transmission. The UE can also determine a number of RBs for the first set of one or more RBs and the second set of one or more RBs based on a corresponding number of RBs in the one or more groups of contiguous PRBs for the data transmission. The number of RBs for the first set of one or more RBs and the second set of one or more RBs may be based on an integer number. For a group of contiguous PRBs for the data transmission that is less than the integer number, a corresponding SRS may be transmitted using a corresponding set of RBs that is increased to the integer number. Also, the integer number can be received in an indication or preconfigured in the UE.

In further aspects, the first SRS can be in a first symbol within a first slot and the second SRS can be in a second symbol within the first slot. The first symbol, the first slot, and the second symbol may be determined based in part on one or more of the configuration and one or more fields in the DCI. In other aspects, the first SRS can be in a first symbol within a first slot and the second SRS can be in a second symbol within a second slot. Also, the first symbol, the first slot, the second symbol and the second slot may be determined based in part on one or more of the configuration and one or more fields in the DCI.

The UE can also receive an indication of a hopping pattern associated with the first set of one or more RBs and the second set of one or more RBs. The first SRS and the second SRS may be transmitted using the hopping pattern. In some aspects, the first set of RBs may be in a first symbol and the second set of RBs may be in a second symbol, and the first symbol and the second symbol may be determined based in part on one or more of the configuration and one or more fields in the DCI. The first set of RBs and the second set of RBs may be mapped using the hopping pattern. Further, the hopping pattern is indicated based on the DCI. The hopping pattern can also be indicated as one of a range of hopping patterns received using one or more the configuration, radio resource control (RRC) signaling, or at least one field in the DCI. In further aspects, the DCI may indicate the hopping pattern, and the hopping pattern may indicate hopping within a group of contiguous PRBs allocated for the data transmission. Also, the hopping pattern may include a first symbol within a first slot and a second symbol within the first slot, and the first symbol, the first slot, and the second symbol may be determined based in part on one or more of the configuration and one or more fields in the DCI. Additionally, the hopping pattern may include a first symbol within a first slot and a second symbol within a second slot, and the first symbol, the first slot, the second symbol and second slot may be determined based in part on one or more of the configuration and one or more fields in the DCI.

In an aspect of the disclosure, a method, a computer-readable medium, and an apparatus are provided for wireless communication at a UE. The apparatus can receive a configuration to transmit one or more SRSs based on a DCI. The apparatus can also receive an indication of a plurality of non-contiguous RBs based on the DCI. The apparatus can transmit a first SRS on a first set of one or more RBs of the plurality of non-contiguous RBs. Further, the apparatus can transmit a second SRS on a second set of one or more RBs of the plurality of non-contiguous RBs. The first set of one or more RBs and the second set of one or more RBs may be separated by a distance of at least one RB.

In a further aspect of the disclosure, a method, a computer-readable medium, and an apparatus are provided for wireless communication at a UE. The apparatus can receive an indication of a plurality of RBs. The apparatus can also receive a SRS configuration corresponding to the indication of the plurality of RBs, can the SRS configuration can include at least one SRS condition to be applied during a temporary SRS window. Also, the apparatus can transmit at least one SRS on a set of one or more RBs of the plurality of RBs according to the SRS configuration and the at least one SRS condition during the temporary SRS window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 6A and 6B display an example of signaling according to the present disclosure.

DETAILED DESCRIPTION

Figure 1:
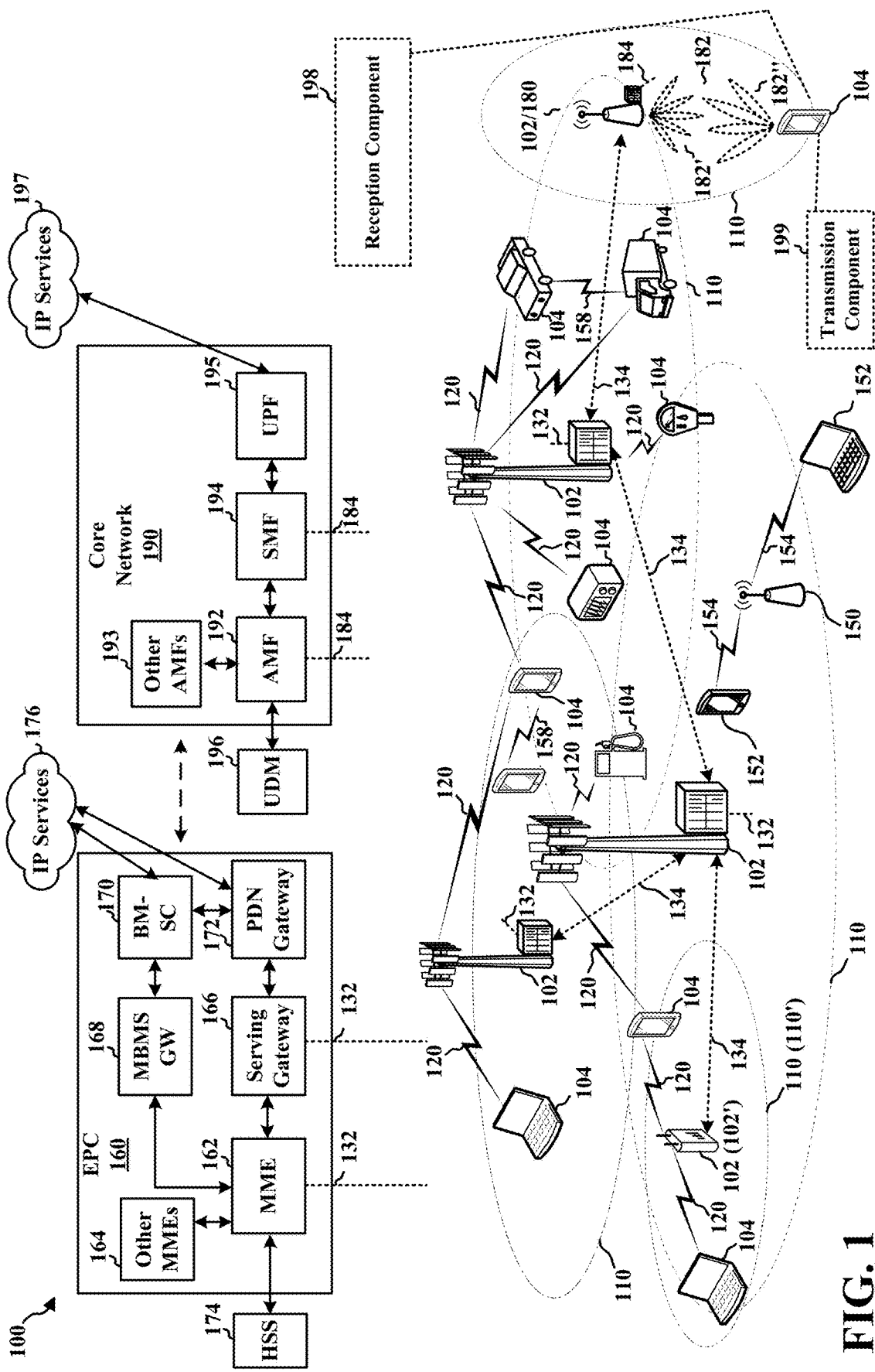
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive a configuration to transmit one or more sounding reference signals (SRSs) based on a downlink control information (DCI). The reception component 198 may also be configured to receive an indication of a plurality of non-contiguous resource blocks (RBs) based on the DCI. The reception component 198 may also be configured to transmit a first SRS on a first set of one or more RBs of the plurality of non-contiguous RBs. The reception component 198 may also be configured to transmit a second SRS on a second set of one or more RBs of the plurality of non-contiguous RBs. In some aspects, the first set of one or more RBs and the second set of one or more RBs may be separated by a distance of at least one RB.

Additionally, UE 104 may include a transmission component 199 configured to receive an indication of a plurality of resource blocks (RBs). The transmission component 199 may also be configured to receive a sounding reference signal (SRS) configuration corresponding to the indication of the plurality of RBs, where the SRS configuration comprises at least one SRS condition to be applied during a temporary SRS window. The transmission component 199 may also be configured to transmit at least one SRS on a set of one or more RBs of the plurality of RBs according to the SRS configuration and the at least one SRS condition during the temporary SRS window.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
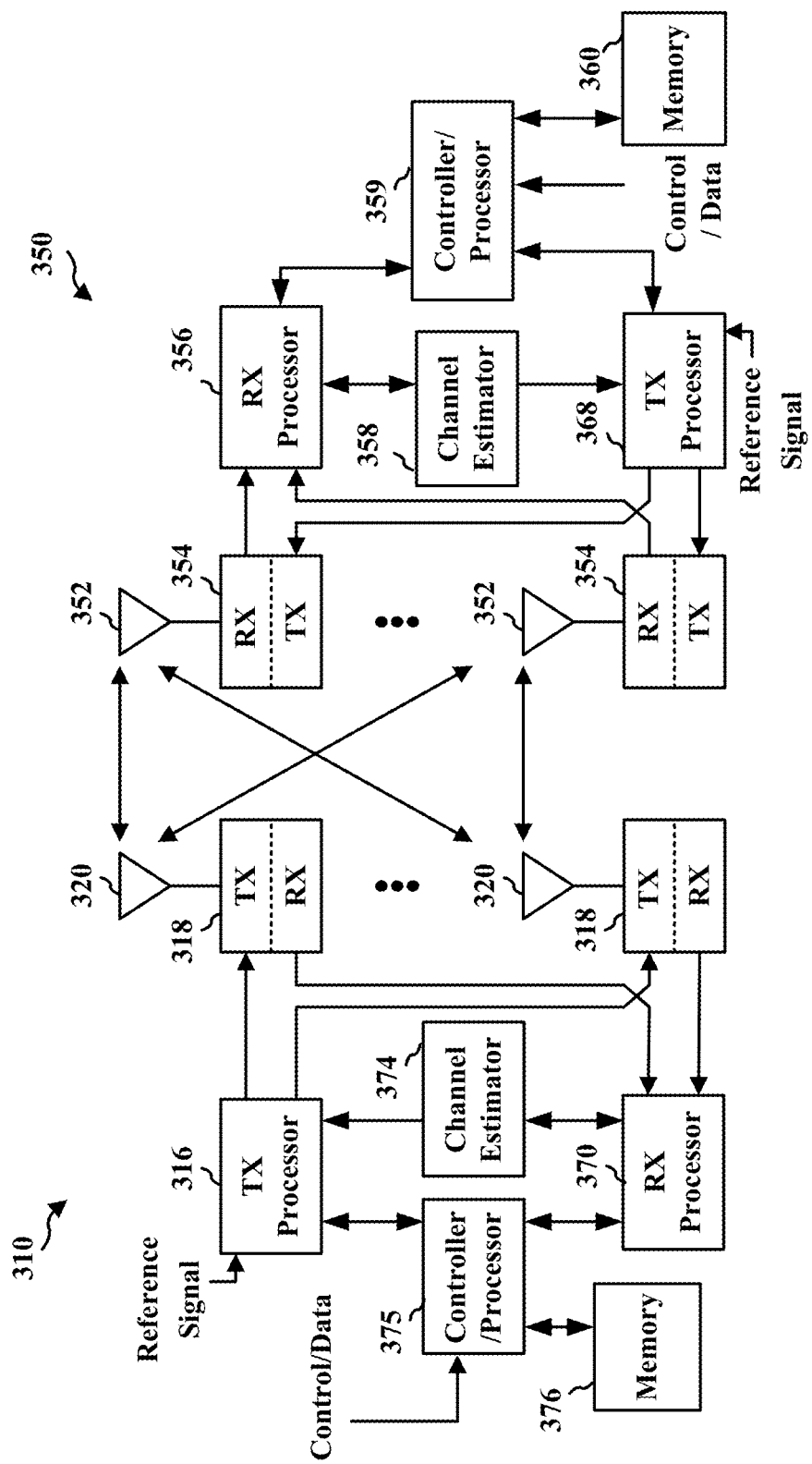
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

Figure 4:
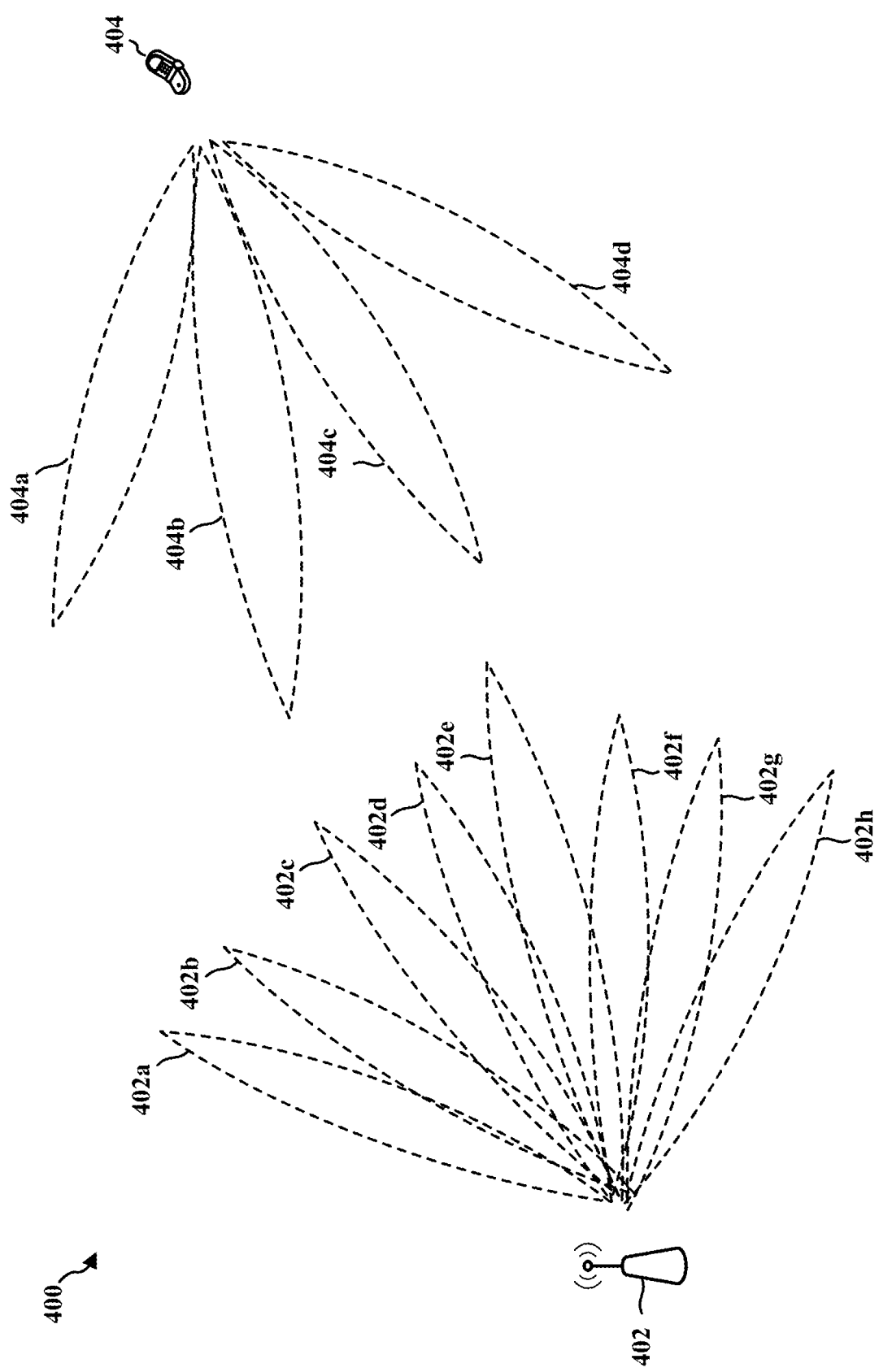
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In wireless communications, e.g., Millimeter Wave (mmW) wireless communication, base stations and UEs can transmit and/or receive a multitude of data between each other. Such data can be allocated over one or more resources. In some instances, the information and/or data can be stored in non-contiguous resources. Accordingly, it can be advantageous and efficient to use signaling enhancement to ensure the accurate transmission and/or reception of data. For instance, signaling or SRS enhancements can be triggered by DCI.

Some aspects of wireless communications according to the present disclosure can include wireless concepts such as spatial diversity. For instance, in some aspects, spatial diversity can involve communication with multiple transmission reception points (TRPs). In these aspects, spatial diversity can be helpful for ultra-reliable low latency communication (URLLC). For example, spatial diversity can be helpful for communication of less than 1 ms latency and $10^{-6}$ reliability, e.g., in factory automation (FA).

Figure 5B:
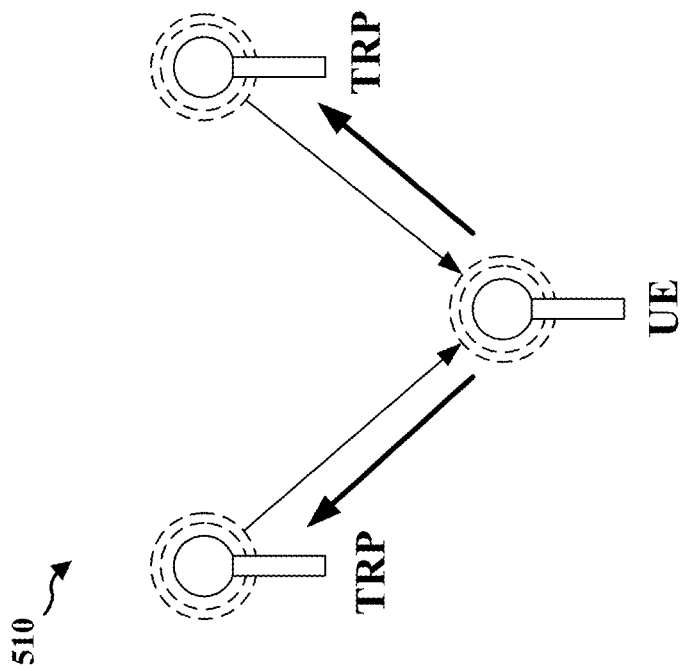
FIGS. 5A and 5B display an example of wireless communication according to the present disclosure.
Figure 5A:
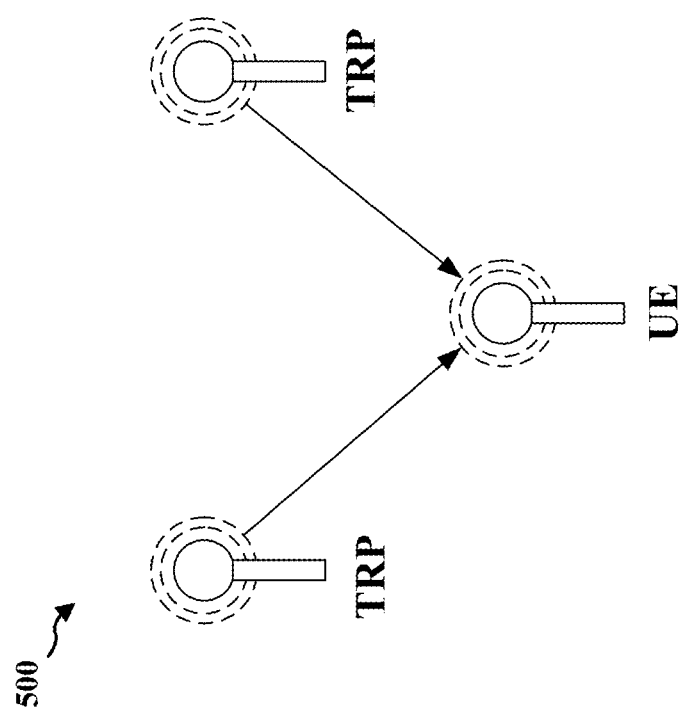

FIG. 5A displays an example of wireless communication 500 according to the present disclosure. More specifically, FIG. 5A displays spatial diversity across TRPs. Spatial diversity can be achieved using Coordinated Multipoint (CoMP) techniques. Some examples of CoMP techniques can include coherent joint transmission techniques, as well as non-coherent joint transmission techniques Aspects of the present disclosure can include uplink reference signals, i.e., signals sent by the UE to TRPs or base stations, for a number of reasons. For instance, disclosure base station can use uplink reference signals from a UE, e.g., sounding reference signals (SRSs), for determining precoding for data transmissions with the UE. For example, uplink reference signals such as SRSs can be used by the base station to estimate a downlink or uplink channel. These channel estimations can occur when downlink and uplink channels are somewhat similar, e.g., in TDD, and adapt parameters of the downlink or uplink transmission, such as precoding, accordingly. SRSs can also be used for CoMP techniques. For instance, aspects of the present disclosure can attempt to understand what the channel is based on a signal from the UE, such as a. SRS. Based on this, in some aspects, the base station or TRP can adapt its transmission.

FIG. 5B displays an example of wireless communication 510 according to the present disclosure. More specifically, FIG. 5B displays an example of downlink CoMP precoding using SRS. The CoMP precoding using SRS can include a number of steps. For instance, the UE can be configured by a TRP to send an SRS. The UE can then send the SRS in an uplink transmission. Multiple TRPs can then measure the SRS sent by the UE, and the network or TRPs can use the SRS measurements to adapt downlink CoMP transmissions to the UE.

Some aspects of the present disclosure can indicate certain SRS configurations based on resources for data, whether PDSCH or PUSCH, being contiguous or non-contiguous. In some aspects, coherent CoMP techniques may be useful to increase downlink capacity. For example, SRS can be used for downlink precoding determination, e.g., assuming that TDD is being used. In other aspects, it may be more efficient to configure the UE to transmit an SRS on data channel RBs associated with the UE. For instance, the TRP may be trying to adapt a precoder for its downlink transmission to the UE. For example, the TRP may not want the UE to transmit over certain RBs. In these instances, the TRP can instruct the UE to transmit SRS in a manner that avoids the certain RBs. This may lead to non-contiguous RBs for the SRS.

In aspects of the present disclosure including industrial Internet of Things (IIoT) or URLLC use cases, RF can be very dynamic and PDSCH allocations may need to be updated quickly, e.g., within one to five ms, in order to keep meeting latency or reliability specifications. For instance, if a PDSCH allocation update results in a change to PDSCH RBs, the SRS may have to be adapted quickly, so that the SRS can be transmitted on an updated set of PDSCH RBs. Also, the SRS may have to be adapted quickly so that the precoding can be updated. If the PDSCH RBs are not contiguous, then the SRS transmission may need to skip or hop frequencies or RBs. RBs groups that are non-contiguous may be referred to as RB islands. In some aspects, the SRS may hop across RBs in a contiguous or non-contiguous set of RBs. In some aspects, the SRS may not be transmitted over non-contiguous RBs in one symbol.

Some aspects of the present disclosure can include a combined DCI to quickly adapt SRS configuration. For instance, to meet URLLC reliability and latency specifications, the network and UEs, should be able to quickly adapt to changing channel conditions. To facilitate resource allocation changes between a TRP and a plurality of UEs, a TRP may transmit downlink control information (DCI) to each UE. However, sending separate DCI for each information type (e.g., uplink data, downlink data, sounding reference signal (SRS), and channel state information reference signal (CSI-RS)) is inefficient and reduces adaptation speed, which increases latency. Accordingly, the joint DCI configuration techniques disclosed herein improve latency, for example, by indicating multiple information types using a single DCI.

In certain aspects, a TRP can be configured for joint DCI configuration by receiving a capability indication from a UE. The capability indication may indicate a capability of a UE to support joint DCI configuration. The capability indication may be sent from the UE (e.g., in one or more of a radio resource control (RRC) message, a Medium Access Control (MAC) Control Element (CE) message, and a Non-Access Stratum (NAS) message). When a UE and TRP are capable of joint DCI configuration, a TRP can determine to indicate allocation of resources for communicating two or more information types to one or more (UEs) in a single DCI. It will be appreciated that joint DCI configuration at least allows for a reduction in DCI transmissions (e.g., compared to a TRP using a DCI for every indication or allocation of resources for communicating each information type).

In certain aspects, a DCI includes an allocation of resources for communicating two or more information types to one or more user equipments (UEs) (e.g., for a plurality of UEs) in a single DCI transmitted by a TRP. In certain aspects, the DCI may include information that explicitly indicates allocated resources for communicating all or at least one of the information types.

In certain aspects, the DCI does not explicitly indicate allocated resources for communicating at least one of the information types. In some such aspects, the allocation of resources for communicating two or more information types to one or more user equipments is further indicated to the one or more UEs using association information. It will be appreciated that the association information is transmitted to the one or more UEs in one or more of: a radio resource control (RRC) message, a MAC (Medium Access Control) Control Element (CE) message, a Non-Access Stratum (NAS) message an association information message, or the DCI. In certain aspects, association information includes an indication that resources for one information type of the two or more information types are allocated relative to resources for another information type of the two or more information types (e.g., the indication indicates that one or more of a downlink data, an uplink data, a CSI-RS and a SRS are allocated to same resource blocks). Accordingly, information in the DCI along with the association information can be used to indicate allocated resources for communicating the at least one of the information types. For example, one of the DCI and association information may indicate explicitly allocation of resources for communicating downlink data, and the other of the DCI and association information may indicate that an indication or allocation of resources for communicating uplink data is the same as an indication or allocation of resources for communicating downlink data. Accordingly, based on the DCI and association information together, allocation of resources for communicating uplink data is indicated.

In certain aspects, the indication or allocation of resources for communicating two or more information types to one or more UEs is further indicated by a radio resource control (RRC) message including information indicative of the allocation of resources for communicating at least one of SRS and CSI-RS. For example, information indicative of the allocation of resources for communicating at least one of SRS and CSI-RS includes one or more of a resource element density, an index of symbols within a slot with a transmission, a number of transmissions after a first transmission, an offset of transmissions after the first transmission, a hopping configuration, a cyclic shift configuration, and periodicity of transmissions after the first transmission.

In certain aspects, the downlink resources granted to a UE for receiving downlink transmissions transmitted from a TRP may change or be different from those indicated in an initial downlink scheduling configuration. For example, an inter-TRP mobility event may occur where a UE moves from a connection with one TRP to a connection with another TRP, channel conditions on a downlink or uplink may change (e.g., RF conditions may change) (e.g., due to a change in location of a UE and/or TRP, electromagnetic interference, a new obstacle, etc.), and accordingly, the TRP may send a DCI using joint DCI configuration.

Figures 6A, 6B:
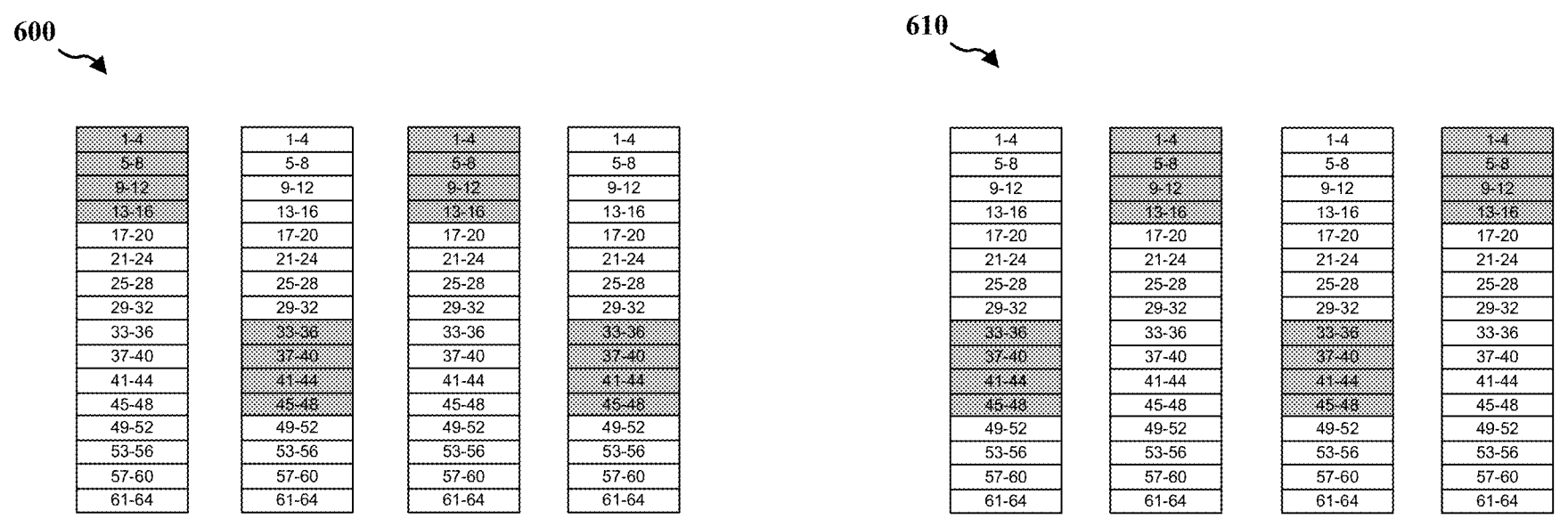

Thus, the RBs used to transmit SRS may correspond to the RBs allocated for a data channel, e.g., PDSCH or PUSCH. As the RBs allocated for the data channel may be adapted, e.g., via DCI, the RBs for SRS transmission may similarly be adapted via a combined DCI. The RBs allocated for the data channel may be non-contiguous, e.g., including PRB islands allocated for the data channel. The RB groups may be referred to as an island, because the RB groups may include subsets of contiguous RBs groups that are separated from each other by at least one RB. In some aspects, a joint or combined DCI can configure SRS hopping across multiple non-contiguous RB groups or PRB islands correspond to the PRB islands allocated for the data channel. SRSs can be important for capacity and SRS may need to be transmitted quickly, e.g., in a dynamic channel. In some aspects, the downlink SRS may be non-contiguous, in which case the present disclosure can support hopping across PRBs or frequencies. As mentioned above, a PRB island can describe a set of non-contiguous RBs. Some aspects of the present disclosure may support hopping across certain sizes of PRB islands, e.g., quantized data channel PRB islands. In these aspects, a quantized PRB island may be formed by rounding-up or increasing each PRB island to a multiple of N PRBs, where N can be an integer (e.g., 1, 2, 4, etc.). In an example in which the integer N is 4, any PRB islands for the data channel that are less than 4 RBs will be increased to 4 RBs for transmission of the corresponding SRS. If a PRB island for PDSCH includes 3 PRBs, the corresponding SRS may be transmitted on the 3 PRBs along with an adjacent PRB in order to span 4 contiguous PRBs. The UE may receive an indication, from a base station, of the integer number for quantizing the groups of RBs for SRS. The SRS may be transmitted in a manner such that the UE hops from transmitting a first SRS on a first set of contiguous RBs and then hops to a different, non-contiguous frequency to transmit a second SRS on a second set of contiguous RBs. The RB hopping, or frequency hopping, for the SRS transmissions may be intra-slot, with the hopping taking place across different symbols within a single slot. In another example, the RB hopping or frequency hopping for the SRS may be inter-slot hopping, in which the hopping takes place across symbols in different slots. In yet another example, the hopping may occur as a combination of intra-slot and inter-slot hopping. As mentioned above, the SRS hopping may take place over contiguous or non-contiguous set of RBs. FIGS. 6A and 6B display examples of signaling according to the present disclosure. More specifically, FIGS. 6A and 6B display examples of PRB island hopping patterns for SRS transmissions. FIG. 6A illustrates a PRB island hopping pattern 600 where the RB range for SRS hops from PRBs 1-16 in a first time period to PRBs 33-48 in a second time period. The time period may correspond to different symbols within a single slot, or to different slots.

In other aspects, the present disclosure can support an indication of a PRB island hopping pattern that is indicated from the base station to the UE. The UE may then apply the indicated pattern in transmitting the SRS. PRB islands may be the same size as one another or different sizes than one another. If the PRB islands are different sizes for a data channel, the UE may quantize the groups of PRBs for SRS transmission in a manner that causes the groups of PRBs to have the same size. In one example, a hopping pattern may indicate different PRB islands for SRS transmission in different symbols. Further, a UE may determine a symbol to PRB island mapping for SRS using a hopping pattern. Hopping patterns according to the present disclosure may inform the UE when and where to start an SRS and when to hop SRSs. These PRB island hopping pattern indications may be sent using a variety of techniques. For instance, hopping patterns may be indicated using RRC signaling, e.g., RRC message may be used to indicate a range of applicable patterns. The pattern range may list the order of PRB islands, e.g., if there are four PRB islands, examples of different patterns may include [1 2 3 4], [2 3 4 1], [3 4 1 2], or [4 1 2 3]. In the example [1 2 3 4], the UE will determine to transmit SRS of the first PRB island in a first symbol, followed by SRS transmitted on a second PRB island in a second symbol, followed by SRS transmitted on a third PRB island in a third symbol, and ending with SRS transmitted on a fourth PRB island in a fourth symbol. In contrast, the pattern [4 1 2 3] indicates to the UE to transmit SRS on the fourth PRB island in a first symbol, transmit SRS on a first PRB island in a second symbol, transmit SRS on a second PRB island in a third symbol, and transmit SRS on a third PRB island in a fourth symbol. Accordingly, the RRC signaling can inform the applicable hopping pattern to apply in transmitting the SRS. Further, the hopping pattern may be indicated using a field in a combined DCI. For example, the field may point to a specific pattern. In some aspects, the combined DCI can include both downlink of the assignment and the SRS of the assignment, as well as where to fix the patterns for SRS hopping. Further, hopping patterns may be indicated using a radio network temporary identifier (RNTI), which can be used for the combined DCI or the symbol, slot, or frame number for the SRS transmission. In some aspects, an RNTI can help to randomize inter and intra cell interference caused by the SRS transmissions. As such, the present disclosure can randomize the hopping pattern. In other aspects, the RRC can indicate a range of applicable patterns, and the DCI can inform which patterns.

FIG. 6A illustrates a PRB island hopping pattern 600 where the RB range hops from 1-16 to 33-48. In one aspect, this PRB island hopping pattern can be listed as [1 2], where '1' is the first PRB island and '2' is the second PRB island. FIG. 6B illustrates a PRB island hopping pattern 610 where the RB range hops from 33-48 to 1-16. This PRB island hopping pattern can be listed as [2 1], where '2' is the second PRB island and '1' is the first PRB island.

In other aspects of the present disclosure, the combined DCI may include a configuration for intra-PRB island hopping. Thus, the UE may hop from PRBs 1-8 in a symbol to PRBs 9-16 in a second symbol, even though PRBs 1-16 form a contiguous group of PRBs for SRS transmission. The intra-PRB island hopping may be combined with inter-PRB island hopping, in which the UE also hops to transmit SRS on non-contiguous sets of PRBs, e.g., PRB islands. The intra-PRB-island hopping may be intra-slot, i.e., the hopping takes place across different symbols in one slot, or inter-slot, i.e., the hopping takes place across symbols in different slots, or a combination of intra-slot and inter-slot. In some aspects, the UE can determine to which pattern the RBs apply by mapping. As indicated above, the UE can map to the first PRB island by referencing '1' and map to the second PRB island by referencing '2'.

In further aspects, the PRB islands allocated for a data channel can have different sizes of islands and indicate these islands to the UE as part of the hopping indication. Also, the PRB islands may be determined based on whether the data channel RBs are contiguous or non-contiguous, e.g., the PRB islands may be determined as contiguous groups of PRBs that are separated from another group by at least one PRB. In one aspect, the UE may quantize the PDSCH allocation in order to determine RBs for SRS transmission. In other aspects, RRC signaling can transmit a hopping pattern as well as number of PRBs for an SRS configuration. As indicated above, the number of PRBs for SRS can be determined based on an integer N. Also, SRS hopping according to the present disclosure can be performed across any number of RBs or frequencies. Moreover, the gap between different RB groups for SRS transmissions can include the same or different number of RBs.

Other aspects may address the potential for SRS corresponding to an updated data channel, to be insufficient for computing decoding for the updated data channel. In some aspects, a TRP or base station may inform a UE to sound an SRS. Then the TRP or base station may measure the SRS. Also, the TRP or base station may determine the precoding based on the measured SRS and use it for data transmissions. In further aspects, when allocated PDSCH RBs are updated, the SRS configuration can be updated to match the PDSCH RBs using the combined DCI. The adjustment to the SRS may be applied in the next SRS occasion following receipt of the DCI. As a group of SRS transmissions may be used together for the base station to compute precoding for the data channel, the UE may switch to the adjusted SRS within the group of SRS transmission. This may lead to an insufficient number of SRS transmissions for the base station to make accurate precoding determinations, e.g., to meet the processing gain targets for a data channel transmission.

Figure 7:
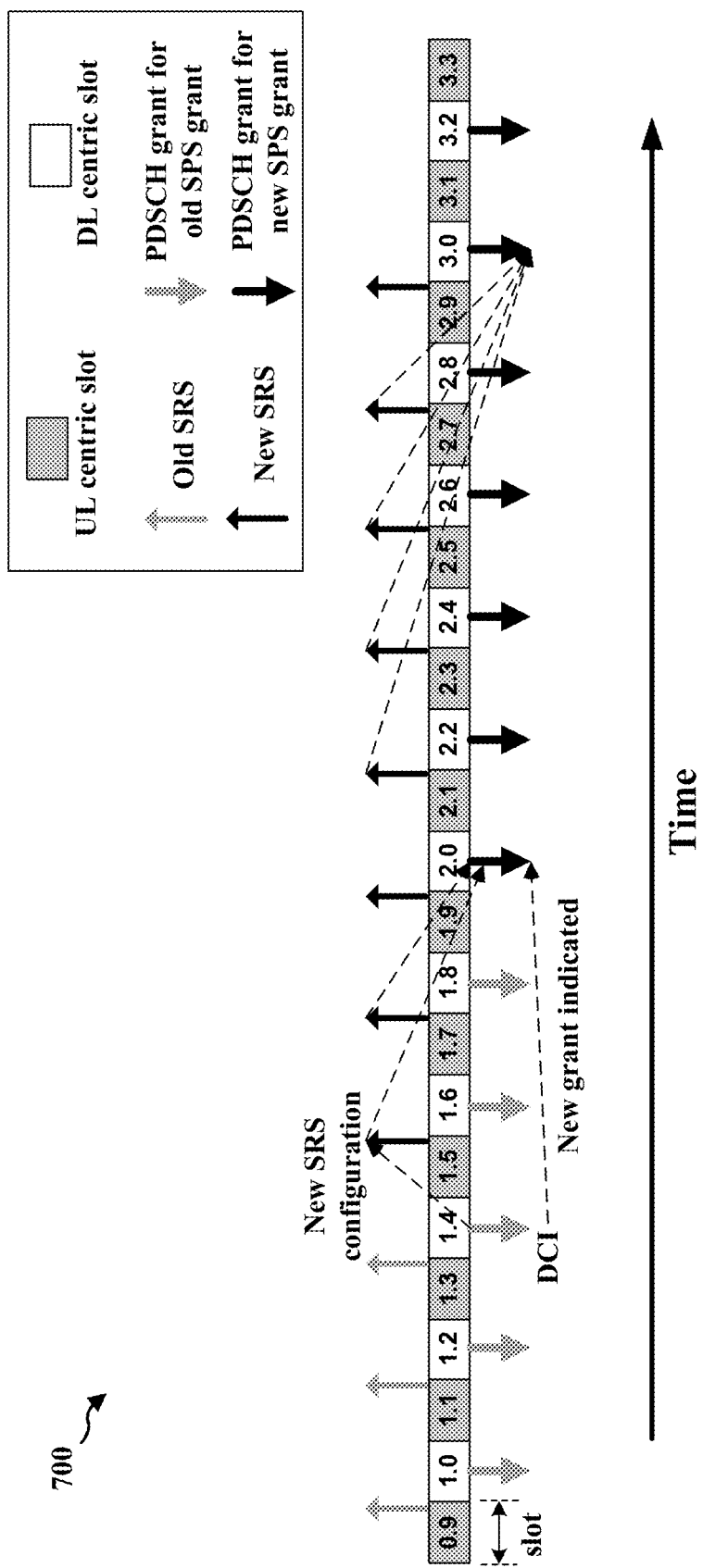
FIG. 7 displays an example of signaling according to the present disclosure.

FIG. 7 displays an example of signaling 700 according to the present disclosure. More specifically, FIG. 7 illustrates PDSCH transmissions and SRS transmissions in different slots. FIG. 7 shows that uplink centric slots are even numbered, while downlink centric slots are odd numbered. As shown in FIG. 7, a first set SRSs based on a first SRS configuration may be transmitted in slots 0.9, 1.1, and 1.3. Following a DCI with an update for the SRS and PDSCH, a second set of SRSs based on a second SRS configuration may be transmitted in slots 1.5, 1.7, 1.9, 2.1, 2.3, 2.5, 2.7, and 2.9. Also, the a first set of PDSCH transmissions may be transmitted in slots 1.0, 1.2, 1.4, 1.6, and 1.8 based on a first PDSCH grant. An updated PDSCH grant may be indicated in the DCI in slot 1.4. A second set of PDSCH transmissions may be transmitted in slots 2.0, 2.2, 2.4, 2.6, 2.8, 3.0, and 3.2 based on a second PDSCH grant indicated in the DCI. A TRP may use a number of SRSs to determine the precoding for the PDSCH. For example, a TRP may use a set of four SRS to determine the precoding for the PDSCH. As illustrated in FIG. 7, the TRP may use SRS in slot 2.1, 2.3, 2.5, and 2.7 to determine precoding for PDSCH in slot 3.0. However, when the SRS configuration changes at slot 1.5, this may leave the TRP with insufficient SRS information to make a precoding determination for the PDSCH in slot 2.0. For example, in slot 1.1 and 1.3, the SRS is according to the first SRS configuration. In slot 1.5 and 1.7, the SRS is according to a second SRS configuration. Thus, the TRP will not have a set of four SRS of the same SRS configuration to make a determination for PDSCH in slot 2.0. Further, in some aspects there may not be sufficient time to update the SRS or to determine precoding. In other aspects, a certain number, e.g., two, of SRS transmissions may be used for precoding. Also, the combined DCI may update the downlink RBs and SRS together.

In order to address this problem, the DCI can configure special SRS condition(s) that apply for a temporary SRS window. For instance, the present disclosure can include a special SRS condition configuration for SRS configured by a DCI that is applicable for a configurable period. The configurable period may be referred to as a special SRS conditions window. This special SRS conditions window may begin with the reception of DCI and the ending can be determined based on an indicated length of the window, e.g., determined based on DCI or an RRC message. Thus, the UE may receive an indication of a window length in DCI or an RRC message and may determine the window to last from receipt of the DCI until the indicated window length has passed. Also, the length of the SRS conditions window can be indicated to the UE in units, e.g., number of slots, or in time. In one example, the TRP or base station can inform the UE to increase transmission power for the SRS during the SRS conditions window. For example, the TRP or base station can indicate the initial conditions to the UE in order to adapt the initial SRS transmission to compensate for a lack of proper SRSs. The DCI may be a combined DCI format or another DCI format. The DCI may include an update to a PUSCH grant or PDSCH grant along with the SRS configuration information. In another example, the DCI may be sent without an updated PDSCH/PUSCH grant and may be used to trigger an SRS, to update an SRS configuration, or to apply the special SRS conditions during the special SRS conditions window, etc. For example, when the SRS is temporarily boosted because the measurement quality goes down, e.g., due to any of interference, mobility, etc., these special SRS conditions can be used.

In one example, the special SRS conditions configuration may include a periodicity, e.g., to allow more frequent SRS during the initial conditions window. In another example, the special SRS conditions configuration may include an indication of symbols, e.g., to allow for more symbols during initial conditions window. In another example, the special SRS conditions configuration may include an indication of density and resource element (RE) offset, e.g., to allow for more symbols during the initial conditions window. In another example, the special SRS conditions configuration may include an indication of an SRS transmit power delta or an SRS transmit power, e.g., to allow higher transmit power during initial conditions window. For the density and RE offset examples, the TRP or base station can instruct the UE to transmit more frequently. As such, instead of transmitting every other slot, the UE can transmit more frequently. In further aspects, the duration of special SRS conditions window may be configured using DCI or RRC signaling, such as a previous RRC message. The special SRS conditions configuration may include any combination of these example conditions.

Figure 8:
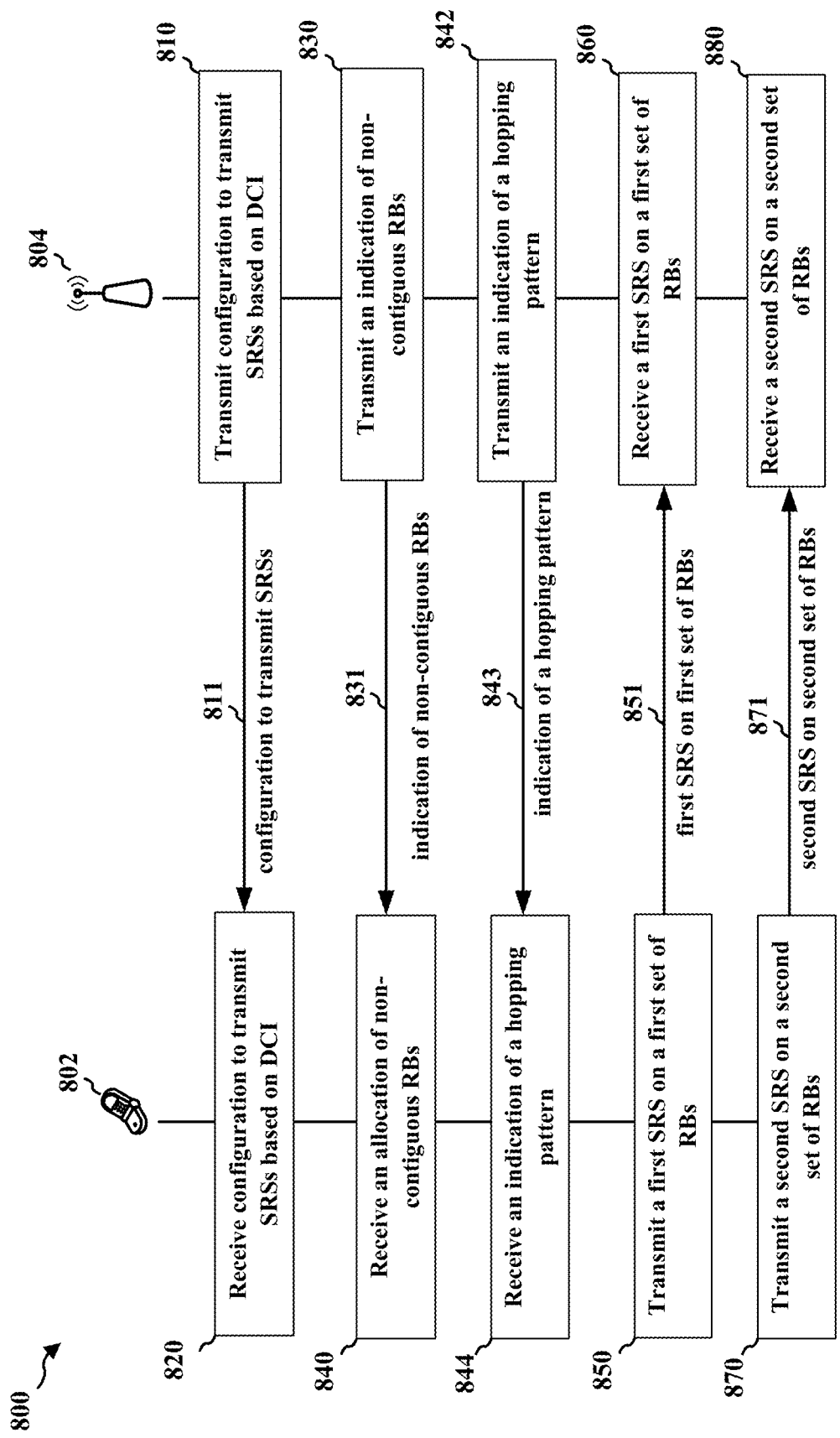
FIG. 8 is a diagram illustrating transmissions between a base station and a UE.

FIG. 8 is a diagram 800 illustrating transmissions between base station 804 and a UE 802. For instance, base station 804 can transmit 810 a configuration to transmit one or more SRSs 811 based on a DCI. The configuration may contain one or more parameters associated with the SRS and may be sent using RRC signaling. UE 802 can receive 820 the configuration to transmit one or more SRSs based on the DCI. Base station 804 can also transmit 830 an indication of a plurality of non-contiguous RBs 831 for a data transmission using the DCI. Likewise, UE 802 can also receive 840 the indication of a plurality of non-contiguous RBs for a data transmission based on the DCI. The plurality of non-contiguous RBs can include one or more groups of RBs, where each group of the RBs can be non-contiguous with other groups of RBs. Each individual RB within a group of RBs can be contiguous with the other individual RBs within the group of RBs. The UE may receive the indication via a DCI. Also, the data transmission can be PDSCH downlink data transmission or a PUSCH uplink data transmission. Base station 804 can also transmit 842 an indication 843 of a hopping pattern associated with the first set of one or more RBs and the second set of one or more RBs. Likewise, UE 802 can receive 844 the indication of a hopping pattern associated with the first set of one or more RBs and the second set of one or more RBs. UE 802 can then transmit 850 a first SRS 851 on a first set of one or more RBs of the plurality of non-contiguous RBs. Base station 804 can receive 860 the first SRS on the first set of one or more RBs of the plurality of non-contiguous RBs. Additionally, the UE can transmit 870 a second SRS 871 on a second set of one or more RBs of the plurality of non-contiguous RBs. Likewise, base station 804 can receive 880 the second SRS on the second set of one or more RBs of the plurality of non-contiguous RBs. The first set of one or more RBs and the second set of one or more RBs may be separated by a distance of at least one RB, as described in connection with the examples in 6A and 6B.

In other aspects, UE 802 can determine one or more groups of contiguous PRBs including one or more RBs in the indication. UE 802 can also determine a number of RBs for the first set of one or more RBs and the second set of one or more RBs based on a corresponding number of RBs in the one or more groups of contiguous PRBs for the data transmission, as described in connection with the examples in 6A and 6B. The number of RBs for the first set of one or more RBs and the second set of one or more RBs may be based on an integer number, e.g., may be increased to a quantized number of RBs based on an integer N. For a group of contiguous PRBs for the data transmission that is less than the integer number, a corresponding SRS may be transmitted using a corresponding set of RBs that is increased to the integer number. Also, the integer number can be received in an indication or pre-configured in the UE.

In further aspects, the first SRS can be in a first symbol within a first slot and the second SRS can be in a second symbol within the first slot. The first symbol, the first slot, and the second symbol may be determined based in part on the configuration or one or more fields in the DCI. In other aspects, the first SRS can be in a first symbol within a first slot and the second SRS can be in a second symbol within a second slot. Also, the first symbol, the first slot, the second symbol and the second slot may be determined based in part on the configuration or one or more fields in the DCI.

The first SRS and the second SRS may be transmitted using the hopping pattern. In some aspects, the first set of RBs may be in a first symbol and the second set of RBs may be in a second symbol, and the first symbol and the second symbol may be determined based in part on one or more of the configuration and one or more fields in the DCI. The first set of RBs and the second set of RBs may be mapped using the hopping pattern. Further, the hopping pattern can be indicated based on the DCI. The hopping pattern can also be indicated as one of a range of hopping patterns received using one or more the configuration, RRC signaling or at least one field in the DCI. In further aspects, the DCI may indicate the hopping pattern, and the hopping pattern may indicate hopping within a group of contiguous PRBs allocated for the data transmission. Also, the hopping pattern may include a first symbol within a first slot and a second symbol within the first slot, and the first symbol, the first slot, and the second symbol may be determined based in part on one or more of the configuration and one or more fields in the DCI. Additionally, the hopping pattern may include a first symbol within a first slot and a second symbol within a second slot, and the first symbol, the first slot, the second symbol and second slot may be determined based in part on one or more of the configuration and one or more fields in the DCI.

In some aspects, the base station may transmit, and the UE may receive, an indication of a plurality of RBs, e.g., for a data transmission. The base station may also transmit, and the UE may receive, an SRS configuration corresponding to the indication of the plurality of RBs for the data transmission. The SRS configuration can include at least one SRS condition to be applied during a temporary SRS window. The UE can also transmit, and the base station can receive, at least one SRS on a set of one or more RBs of the plurality of RBs according to the SRS configuration and the at least one SRS condition during the temporary SRS window. The UE can apply the at least one SRS condition during the temporary SRS window and transmit the at least one SRS according to the SRS configuration without the at least one SRS condition after the temporary SRS window. Also, at least a portion of the SRS configuration can be included in a DCI. The indication of PRBs can also be included in the DCI.

In other aspects, the base station can transmit, and the UE can receive, the DCI, where the temporary SRS window can begin when the DCI is transmitted. The DCI can be in a combined DCI format. The DCI may not indicate a new PUSCH grant or a PDSCH grant. Also, the DCI may include an update for a PUSCH grant or a PDSCH grant. The DCI may include or update a PUSCH grant or a PDSCH grant based on boosting a transmit power of the at least one SRS. Additionally, the DCI may trigger the transmission of the at least one SRS. The DCI may also update a prior SRS configuration. The at least one SRS condition may include at least one of: a periodicity, a set of one or more symbols, an RE density, an RE offset, an SRS transmit power, or an SRS transmit power differential. Moreover, at least a portion of the SRS window may be configured using DCI or an RRC message.

Figure 9:
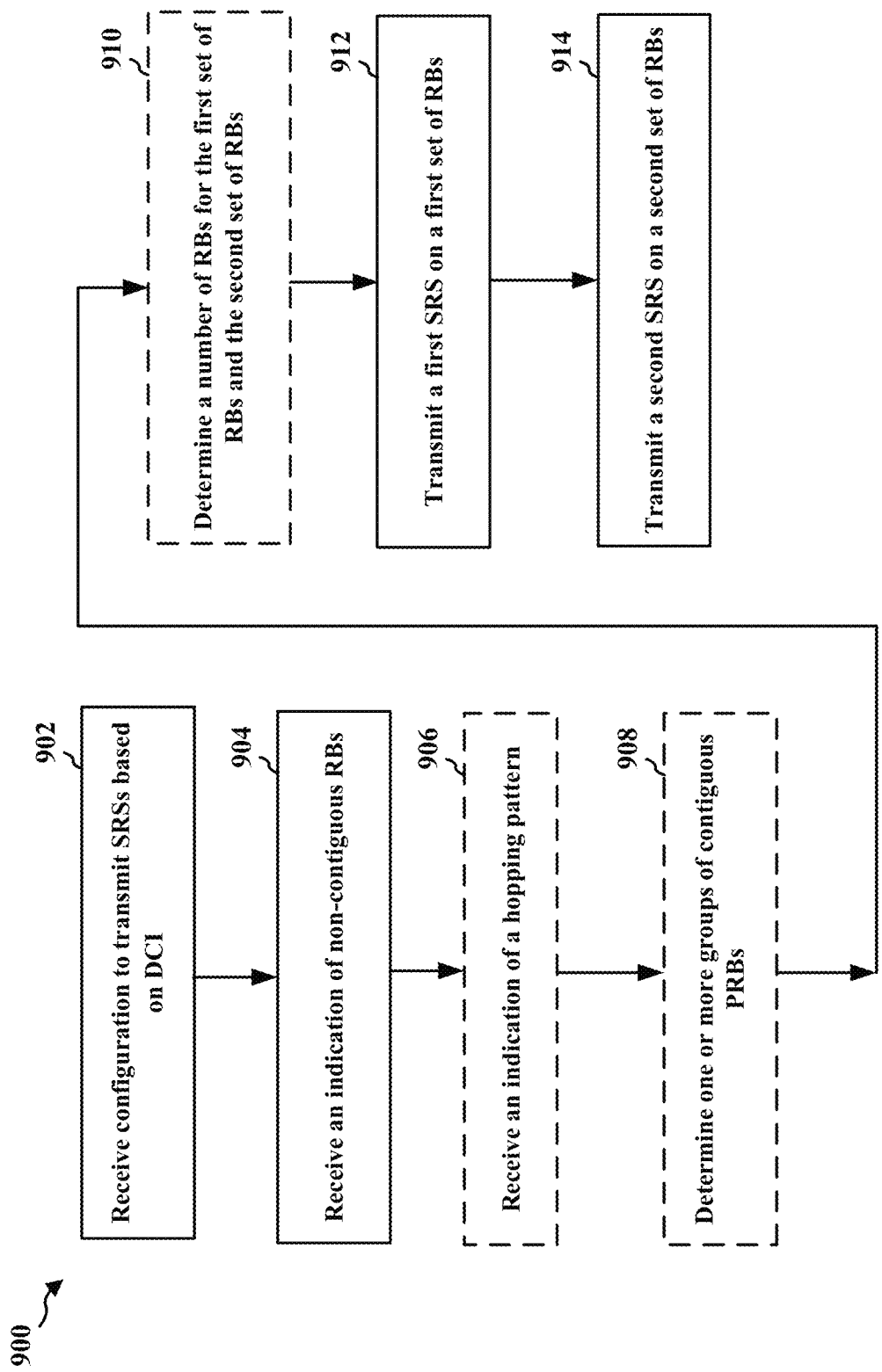
FIG. 9 is a flowchart of a method of wireless communication.

FIG. 9 is a flowchart 900 of a method of wireless communication. The method may be performed by a UE or a component of a UE (e.g., UE 104, 350, 404, 802, apparatus 1002; processing system 1114, which may include the memory 360 and which may be the entire UE or a component of the UE, such as the TX processor 368, the RX processor 356, and/or the controller/processor 359) communicating with a base station (e.g., base station 102, 180, 310, 402, 804). Optional aspects are illustrated with a dashed line. The methods described herein can provide a number of benefits, such as improving communication signaling, resource utilization, and/or power savings.

At 902, the UE can receive a configuration to transmit one or more SRSs based on a DCI. For example, reception component 1004 of apparatus 1002 may receive a configuration to transmit one or more SRSs based on a DCI. At 904, the UE can also receive an indication of a plurality of non-contiguous RBs based on the DCI. For example, reception component 1004 of apparatus 1002 may receive a configuration to transmit one or more SRSs based on a DCI. At 906, the UE can receive an indication of a hopping pattern associated with the first set of one or more RBs and the second set of one or more RBs. For example, reception component 1004 of apparatus 1002 may receive an indication of a hopping pattern associated with the first set of one or more RBs and the second set of one or more RBs.

At 908, the UE can determine one or more groups of contiguous PRBs including one or more RBs in the indication. For example, determination component 1006 of apparatus 1002 may determine one or more groups of contiguous PRBs including one or more RBs in the indication. At 910, the UE can also determine a number of RBs for the first set of one or more RBs and the second set of one or more RBs based on a corresponding number of RBs in the one or more groups of contiguous PRBs, as described in connection with the examples in 6A and 6B. For example, determination component 1006 of apparatus 1002 may determine a number of RBs for the first set of one or more RBs and the second set of one or more RBs based on a corresponding number of RBs in the one or more groups of contiguous PRBs.

At 912, the UE can then transmit a first SRS on a first set of one or more RBs of the plurality of non-contiguous RBs. For example, transmission component 1012 of apparatus 1002 may transmit a first SRS on a first set of one or more RBs of the plurality of non-contiguous RBs. At 914, the UE can transmit a second SRS on a second set of one or more RBs of the plurality of non-contiguous RBs. For example, transmission component 1012 of apparatus 1002 may transmit a second SRS on a second set of one or more RBs of the plurality of non-contiguous RBs. The first set of one or more RBs and the second set of one or more RBs may be separated by a distance of at least one RB, as described in connection with the examples in FIGS. 6A and 6B.

The number of RBs for the first set of one or more RBs and the second set of one or more RBs may be based on an integer number. For a group of contiguous PRBs for the data transmission that is less than the integer number, a corresponding SRS may be transmitted using a corresponding set of RBs that is increased to the integer number. The integer number can be received in an indication or pre-configured in the UE. In some aspects, the first SRS can be in a first symbol within a first slot and the second SRS can be in a second symbol within the first slot or a second slot. The first symbol, the first slot, and the second symbol may be determined based in part on the configuration or one or more fields in the DCI.

The first SRS and the second SRS may be transmitted using the hopping pattern. In some aspects, the first set of RBs may be in a first symbol and the second set of RBs may be in a second symbol. The first set of RBs and the second set of RBs may be mapped using the hopping pattern. Additionally, the hopping pattern can be indicated based on the DCI. The hopping pattern can also be indicated as one of a range of hopping patterns received using one or more the configuration, RRC signaling or at least one field in the DCI. In some aspects, the DCI may indicate the hopping pattern, and the hopping pattern may indicate hopping within a group of contiguous PRBs allocated for the data transmission. Also, the hopping pattern may include a first symbol within a first slot and a second symbol within the first slot or a second slot. In some aspects, the indication of the plurality of non-contiguous RBs can be an allocation of the plurality of non-contiguous RBs for a data transmission.

Figure 10:
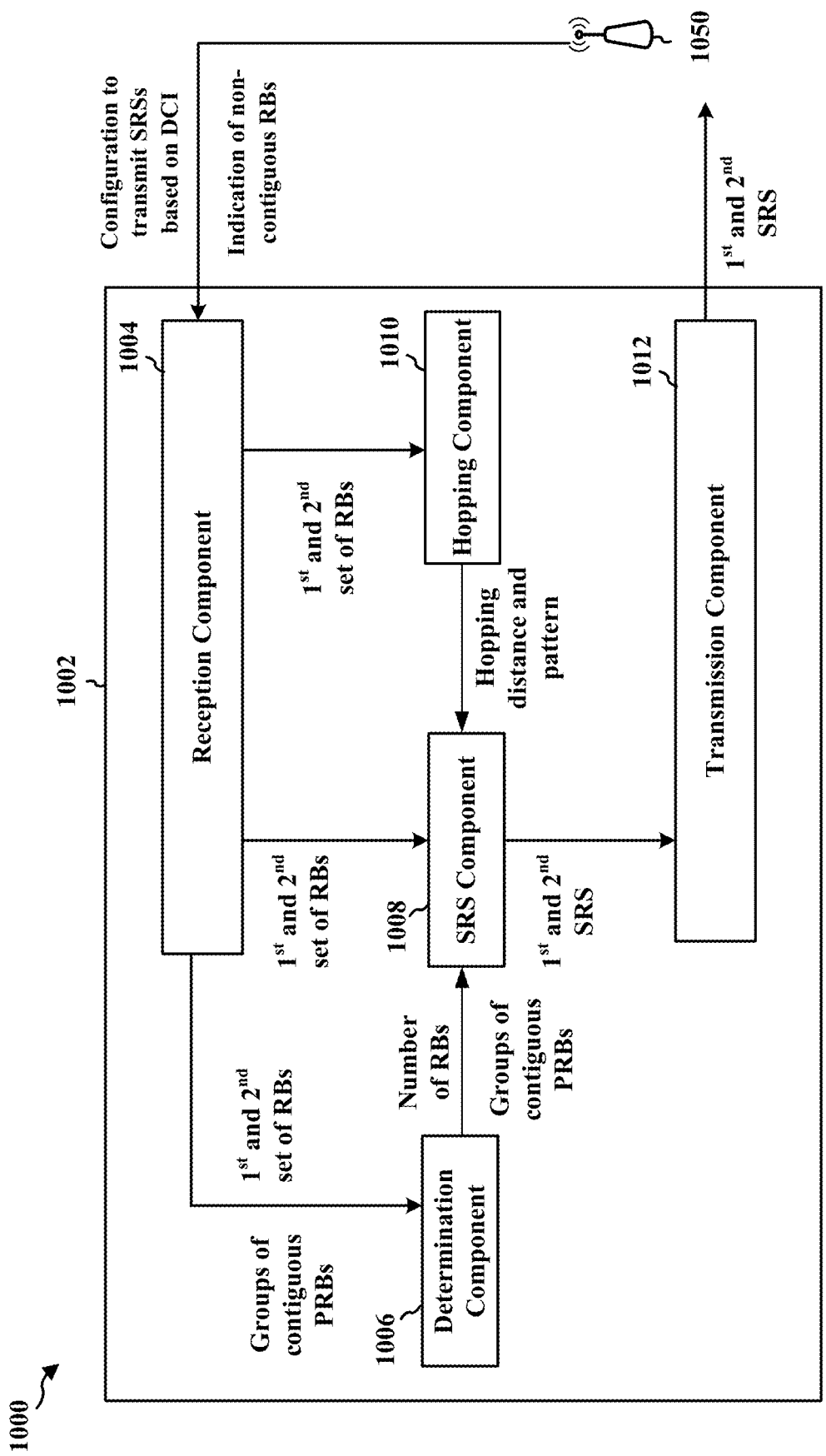
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus includes a reception component 1004 that is configured to receive a configuration to transmit SRSs based on DCI, e.g., as described in connection with step 902 above. Reception component 1004 is also configured to receive an indication of non-contiguous RBs for data, e.g., PDSCH or PUSCH, e.g., as described in connection with step 904 above. The apparatus includes a determination component 1006 that is configured to determine one or more groups of contiguous PRBs, e.g., as described in connection with step 908 above. Determination component 1006 is also configured to determine a number of RBs for the first set of RBs and the second set of RBs, e.g., as described in connection with step 910 above. The apparatus also includes an SRS component 1008 that is configured to transmit, e.g., via transmission component 1012, a first SRS on a first set of RBs, e.g., as described in connection with step 912 above. SRS component 1008 is also configured to transmit, e.g., via transmission component 1012, a second SRS on a second set of RBs, e.g., as described in connection with step 914 above. The apparatus also includes a hopping component 1010 that is configured to receive, e.g., via reception component 1004, an indication of a hopping pattern, e.g., as described in connection with step 906 above.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
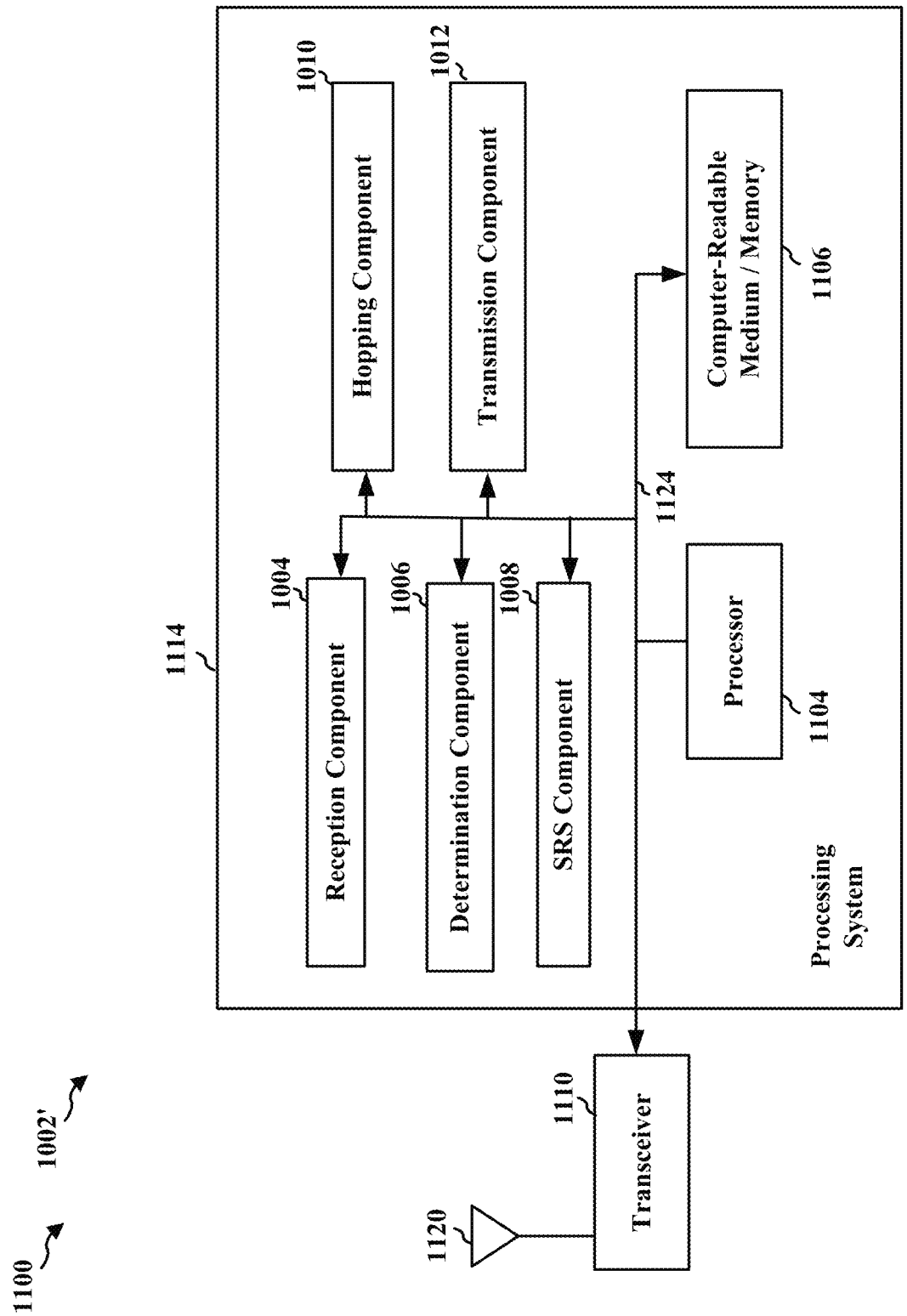
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a configuration to transmit one or more SRSs based on a DCI. The apparatus can also include means for receiving an indication of a plurality of non-contiguous RBs for a data transmission based on the DCI. The apparatus can also include means for transmitting a first SRS on a first set of one or more RBs of the plurality of non-contiguous RBs. Additionally, the apparatus can include means for transmitting a second SRS on a second set of one or more RBs of the plurality of non-contiguous RBs. The apparatus can further include means for determining one or more groups of contiguous PRBs including one or more RBs in the indication for the data transmission. The apparatus can also include means for determining a number of RBs for the first set of one or more RBs and the second set of one or more RBs based on a corresponding number of RBs in the one or more groups of contiguous PRBs for the data transmission. Moreover, the apparatus can include means for receiving an indication of a hopping pattern associated with the first set of one or more RBs and the second set of one or more RBs. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
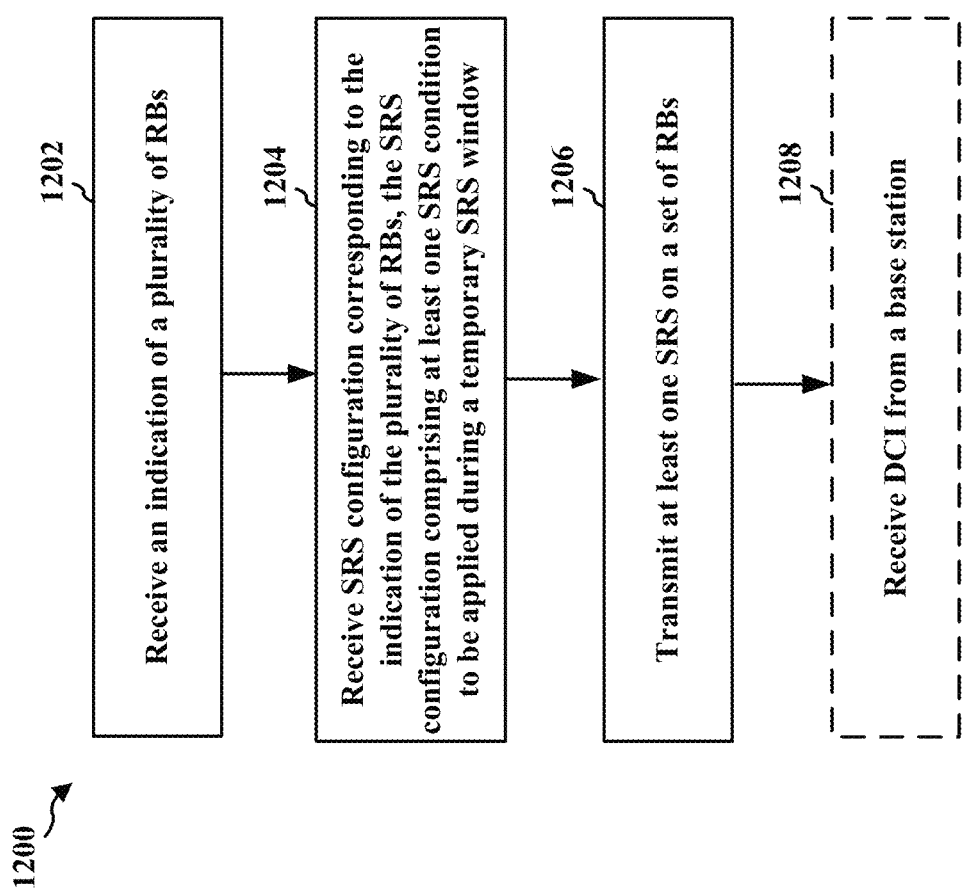
FIG. 12 is a flowchart of a method of wireless communication.

FIG. 12 is a flowchart 1200 of a method of wireless communication. The method may be performed by a UE or a component of a UE (e.g., UE 104, 350, 404, 802, apparatus 1302; processing system 1414, which may include the memory 360 and which may be the entire UE or a component of the UE, such as the TX processor 368, the RX processor 356, and/or the controller/processor 359) communicating with a base station (e.g., base station 102, 180, 310, 402, 804). Optional aspects are illustrated with a dashed line. The methods described herein can provide a number of benefits, such as improving communication signaling, resource utilization, and/or power savings.

At 1202, the UE can receive an indication of a plurality of RBs, e.g., for a data transmission. For example, reception component 1304 of apparatus 1302 may receive an indication of a plurality of RBs. At 1204, the UE may receive an SRS configuration corresponding to the indication of the plurality of RBs, e.g., for the data transmission. For example, reception component 1304 of apparatus 1302 may receive an SRS configuration corresponding to the indication of the plurality of RBs. The SRS configuration can include at least one SRS condition to be applied during a temporary SRS window, as described in connection with the example in FIG. 7. At 1206, the UE can transmit at least one SRS on a set of one or more RBs of the plurality of RBs according to the SRS configuration and the at least one SRS condition during the temporary SRS window. For example, transmission component 1312 of apparatus 1302 may transmit at least one SRS on a set of one or more RBs of the plurality of RBs according to the SRS configuration and the at least one SRS condition during the temporary SRS window. The UE can apply the at least one SRS condition during the temporary SRS window and transmit the at least one SRS according to the SRS configuration without the at least one SRS condition after the temporary SRS window. Also, at least a portion of the SRS configuration can be included in a DCI. The indication of PRBs can also be included in the DCI.

At 1208, the UE can receive the DCI, where the temporary SRS window can begin when the DCI is transmitted. For example, reception component 1304 of apparatus 1302 may receive the DCI, where the temporary SRS window can begin when the DCI is transmitted. The DCI can be in a combined DCI format. The DCI may not indicate a new PUSCH grant or a PDSCH grant. Also, the DCI may include an update for a PUSCH grant or a PDSCH grant. The DCI may include or update a PUSCH grant or a PDSCH grant based on boosting a transmit power of the at least one SRS. Additionally, the DCI may trigger the transmission of the at least one SRS. The DCI may also update a prior SRS configuration. The at least one SRS condition may include at least one of: a periodicity, a set of one or more symbols, an RE density, an RE offset, an SRS transmit power, or an SRS transmit power differential. Moreover, at least a portion of the SRS window may be configured using DCI or an RRC message. In some aspects, the indication of the plurality of RBs can be an allocation of the plurality of RBs for a data transmission.

Figure 13:
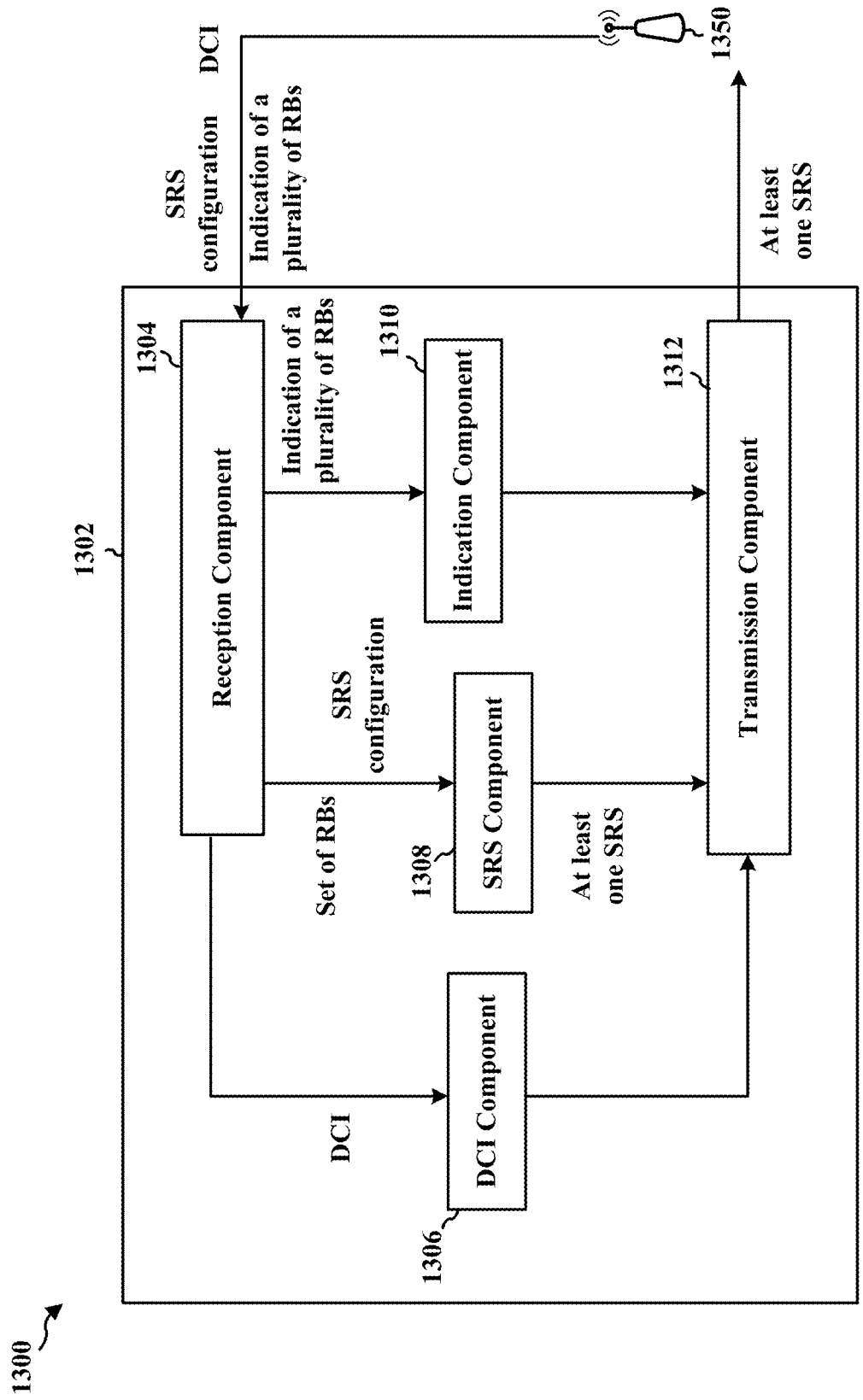
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE or a component of a UE. The apparatus includes a DCI component 1306 that is configured to receive, e.g., via reception component 1304, a DCI from a base station, e.g., as described in connection with step 1208 above. The apparatus also includes an SRS component 1308 that is configured to receive, e.g., via reception component 1304, an SRS configuration corresponding to indication of the plurality of RBs, e.g., for a data transmission, e.g., as described in connection with step 1204 above. SRS component 1308 is also configured to transmit, e.g., via transmission component 1312, at least one SRS on a set of RBs, e.g., as described in connection with step 1206 above. The apparatus also includes an indication component 1310 that is configured to receive, e.g., via reception component 1304, an indication of a plurality of RBs for a data transmission, e.g., as described in connection with step 1202 above.

The apparatus may include additional components that perform each of the blocks of the algorithm in the aforementioned flowcharts of FIGS. 8 and 12. As such, each block in the aforementioned flowcharts of FIGS. 8 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
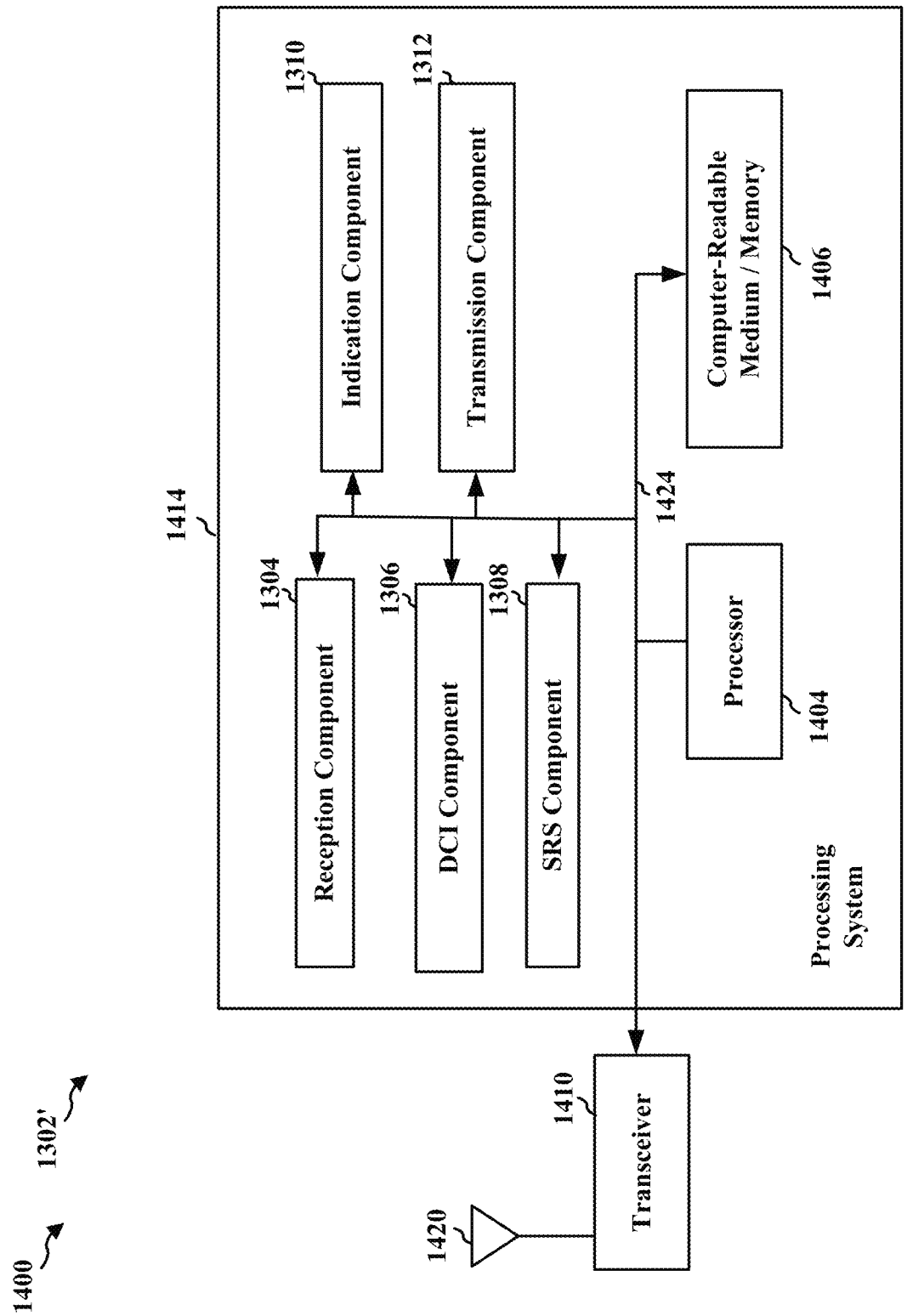
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1312, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving an indication of a plurality of RBs, e.g., for a data transmission. The apparatus also includes means for receiving a SRS configuration corresponding to the indication of the plurality of RBs for the data transmission, where the SRS configuration includes at least one SRS condition to be applied during a temporary SRS window. The apparatus also includes means for transmitting at least one SRS on a set of one or more RBs of the plurality of RBs according to the SRS configuration and the at least one SRS condition during the temporary SRS window. Additionally, the apparatus includes means for receiving the DCI from a base station, where the temporary SRS window begins when the DCI is received. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving an indication of a plurality of resource blocks (RBs);
   receiving a sounding reference signal (SRS) configuration corresponding to the indication of the plurality of RBs, wherein the SRS configuration comprises at least one SRS condition to be applied during a temporary SRS window;

transmitting at least one SRS occasion on a first set of one or more RBs of the plurality of RBs according to the SRS configuration and the at least one SRS condition during the temporary SRS window; and transmitting, based on the received SRS configuration, at least one additional SRS occasion on a second set of one or more RBs of the plurality of RBs according to the SRS configuration without the at least one SRS condition after the temporary SRS window.

2. The method of claim 1, wherein at least a portion of the SRS configuration is included in downlink control information (DCI).

3. The method of claim 2, wherein the indication of the plurality of RBs is included in the DCI.

4. The method of claim 2, further comprising:
receiving the DCI from a base station, wherein the temporary SRS window begins when the DCI is received.

5. The method of claim 2, wherein the DCI does not indicate a new physical uplink shared channel (PUSCH) grant or a physical downlink shared channel (PDSCH) grant.

6. The method of claim 5, wherein the DCI includes or updates a PUSCH grant or a PDSCH grant based on boosting a transmit power of the at least one SRS occasion.

7. The method of claim 2, wherein the DCI triggers transmission of the at least one SRS occasion.

8. The method of claim 2, wherein the DCI updates a prior SRS configuration.

9. The method of claim 2, wherein the portion of the SRS configuration included in the DCI comprises an additional indication of an end of the temporary SRS window, and wherein transmitting the at least one additional SRS occasion comprises: transmitting the at least one additional SRS occasion according to the SRS configuration without the at least one SRS condition based on the additional indication.

10. The method of claim 1, wherein the at least one SRS condition includes at least one of: a periodicity, a set of one or more symbols, a resource element (RE) density, an RE offset, an SRS transmit power, or an SRS transmit power differential.

11. The method of claim 1, wherein at least a portion of the temporary SRS window is configured using downlink control information (DCI) or a radio resource control (RRC) message.

12. The method of claim 1, wherein the indication of the plurality of RBs is an allocation of the plurality of RBs for a data transmission.

13. An apparatus for wireless communication at a User Equipment (UE), comprising:
a memory; and
at least one processor coupled to the memory and configured to:
receive an indication of a plurality of resource blocks (RBs);
receive a sounding reference signal (SRS) configuration corresponding to the indication of the plurality of RBs, wherein the SRS configuration comprises at least one SRS condition to be applied during a temporary SRS window;
transmit at least one SRS occasion on a first set of one or more RBs of the plurality of RBs according to the SRS configuration and the at least one SRS condition during the temporary SRS window; and
transmit, based on the received SRS configuration, at least one additional SRS occasion on a second set of one or more RBs of the plurality of RBs according to the SRS configuration without the at least one SRS condition after the temporary SRS window.

14. The apparatus of claim 13, wherein at least a portion of the SRS configuration is included in downlink control information (DCI), wherein the indication of the plurality of RBs is included in the DCI.

15. The apparatus of claim 14, wherein the portion of the SRS configuration included in the DCI comprises an additional indication of an end of the temporary SRS window, and wherein to transmit the at least one additional SRS occasion, the at least one processor is configured to: transmit the at least one additional SRS occasion according to the SRS configuration without the at least one SRS condition based on the additional indication.

* * * * *